(12) United States Patent
Franz

(10) Patent No.: US 8,194,253 B2
(45) Date of Patent: Jun. 5, 2012

(54) FIBER OPTIC SENSOR HEAD AND INTERFEROMETRIC MEASURING SYSTEM

(75) Inventor: Gerald Franz, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 469 days.

(21) Appl. No.: 12/384,126

(22) Filed: Mar. 31, 2009

(65) Prior Publication Data
US 2010/0091265 A1 Apr. 15, 2010

(30) Foreign Application Priority Data

Apr. 30, 2008 (DE) .......................... 10 2008 001 485
Jun. 4, 2008 (DE) .......................... 10 2008 002 206

(51) Int. Cl.
*G01B 9/02* (2006.01)
(52) U.S. Cl. ....................................................... 356/482
(58) Field of Classification Search .................. 356/482, 356/477, 479, 496–498, 511
See application file for complete search history.

(56) References Cited

U.S. PATENT DOCUMENTS 6,396,572 B1 5/2002 Chawng et al.
7,493,227 B2 * 2/2009 Ozcan et al. .................. 702/127

FOREIGN PATENT DOCUMENTS

| DE | 198 08 273 | 9/1999 |
| DE | 198 19 762 | 11/1999 |
| EP | 1598635 | 11/2005 |
| WO | WO 99/19693 | 4/1999 |
| WO | WO 02/10677 | 2/2002 |
| WO | WO 2006/065772 | 6/2006 |

* cited by examiner

*Primary Examiner* — Hwa Lee
(74) *Attorney, Agent, or Firm* — Kenyon & Kenyon LLP

(57) ABSTRACT

A fiber optic sensor head for detecting the shape or the distance of a test object has an optical fiber, in particular a glass fiber, for conducting and returning partial beams to and from the test object, and an injection/extraction lens on the test object side. For conducting partial beams, injected on the sensor head side and having an optical path length difference, to the test object and returning partial beams injected on the test object side without an optical path length difference, a Fizeau interferometer having a nondiscrete design is associated with the optical fiber and compensates for the optical path length difference between the partial beams.

9 Claims, 3 Drawing Sheets

FIBER OPTIC SENSOR HEAD AND INTERFEROMETRIC MEASURING SYSTEM

BACKGROUND OF THE INVENTION

1. Field of the Invention

The present invention relates to a fiber optic sensor head for detecting the shape or the distance a test object, the sensor head having an optical fiber for conducting and returning two partial beams to and from the test object and an injection/extraction lens on the test object side. The present invention further relates to an interferometric measuring system for detecting the shape or the distance of a test object, having a unit designed as a modulation interferometer and configured for generating two partial beams having an optical path length difference, and having a measuring probe and/or a reference probe.

2. Description of Related Art

Such an interferometric measuring system is described in published German patent document DE 198 08 273 by the present applicant. This and other types of interferometric measuring systems are particularly suited for interferometrically measuring rough surfaces of a measured object in the form of a test object. For this type of measuring system it has proven to be particularly advantageous that broadband radiation which is short-coherent over time may be generated by the modulation interferometer, and as it has high spatial coherence at the same time, may be used for heterodyne interferometric measurement of a rough surface. In the above-referenced patent application, a similar measuring probe for the interferometric measuring system is provided with a measuring branch and a measuring reference branch as well as a beam splitter, and is designed as a Michelson or Mireau interferometer. The optical path difference generated in the measuring branch and in the measuring reference branch is compensated for using a delay element.

These types of interferometric measuring systems not only have proven to be advantageous compared to mechanical sensors, which as a result of the necessary surface contact may damage sensitive surfaces, but also have the advantages described in the above-referenced patent application with regard to the possibility for using broadband radiation which is short-coherent over time.

However, the Michelson or Mireau interferometers for the measuring probe and/or reference probe provided in the cited patent application have proven to be comparatively space-consuming, since the measuring branch and the measuring reference branch must be situated transversely to one another.

A measuring probe, having a different design in this respect, for use with a modulation interferometer is disclosed in published German patent document DE 198 19 762, but is still in need of improvement.

BRIEF SUMMARY OF THE INVENTION

An object of the present invention is to provide a probe and an interferometric measuring system which, in addition to the advantages stated at the outset, may also be implemented in a particularly economical and space-saving manner. A further aim is to allow implementation of a probe and an interferometric measuring system which are particularly robust.

This object is achieved with regard to the probe by use of a fiber optic sensor head of the type described at the outset, in which, according to the present invention, for conducting partial beams, injected on the sensor head side and having an optical path length difference, to the test object and returning the partial beams on the test object side without an optical path length difference, a Fizeau interferometer having a nondiscrete design is associated with the optical fiber and eliminates the optical path length difference between the two partial beams.

The present invention is based on the concept that the space requirements of Michelson or Mireau interferometers are dictated in particular by their interferometer branches, which are situated essentially perpendicular to one another. The present invention recognizes that, in comparison with DE 198 19 762 A1, a Fizeau interferometer having a nondiscrete design may be advantageously provided with interferometer branches which are essentially colinear. Compared to the Michelson or Mireau interferometers, this results in the decisively advantageous possibility of situating the Fizeau interferometer in the fiber optic sensor head in a particularly space-saving manner.

The present invention further relates to the interferometric measuring system of the type described at the outset, in which according to the present invention the measuring probe and/or reference probe are designed as a probe having the fiber optic sensor head according to the concept of the present invention.

According to the present invention, the interferometric measuring system is used for detecting the shape of any given surfaces, i.e., solid body surfaces. The examination of glass, plastic, or metal surfaces has proven to be particularly advantageous. Furthermore, it has been shown that, using a fiber optic sensor head according to the concept of the present invention having a particularly compact design, the interferometric measuring system may be used particularly well for measuring surfaces which are relatively difficult to access, such as small boreholes, for example, and/or due to its robustness may be used even under comparatively adverse production conditions.

In one exemplary refinement of the present invention, the Fizeau interferometer having a nondiscrete design is integrated into the optical fiber. In principle, the Fizeau interferometer having a nondiscrete design could also be provided outside the optical fiber. However, the Fizeau interferometer having a nondiscrete design which is integrated into the optical fiber is particularly advantageous. Besides the optical fiber, the Fizeau interferometer advantageously requires no additional space. In one very particularly preferred refinement of the present invention, it is provided that for forming the Fizeau interferometer the optical fiber has a fiber grating which acts as a Bragg reflector. This has the advantage that the Fizeau interferometer may be integrated within the optical fiber in a particularly simple manner.

The fiber grating is advantageously introduced into the optical fiber using UV radiation. It has been shown that the refractive index of an optical fiber may be structured in a particularly suitable manner by using UV radiation. Modulation of the refractive index for producing the fiber grating is advantageously carried out in the optical fiber.

It has proven to be particularly advantageous that the UV wavelength range is suitable for structuring the refractive index of an optical fiber. These are particularly suitable prerequisites for aligning the fiber grating parallel to the cross section of the optical fiber. The fiber grating is thus aligned essentially perpendicularly for guiding the partial beams, and acts as a Bragg reflector.

The optical fiber is advantageously designed as a single-mode fiber. In principle, however, other types of fibers are also suitable, which may be selected as needed.

With regard to the interferometric measuring system, it has proven to be particularly advantageous that, as described at the outset, the radiation generated by the modulation interferometer is short-coherent over time and is broadband. In particular, the modulation interferometer and the measuring probe and/or reference probe may be connected in a light-guiding manner via a single-mode fiber described above, and thus may be compactly situated at a distance from one another inside the interferometric system.

As described in detail in published German patent documents DE 198 08 273 and DE 198 19 762, for heterodyne detection the modulation interferometer may advantageously be provided with a device for modulating the light phase or for shifting the light frequency of a first partial beam with respect to the light phase or light frequency of a second partial beam. The disclosed contents of published German patent documents DE 198 08 273 and DE 198 19 762 are hereby fully incorporated by reference into the disclosure of the present patent application.

DETAILED DESCRIPTION OF THE INVENTION

Figure 1:
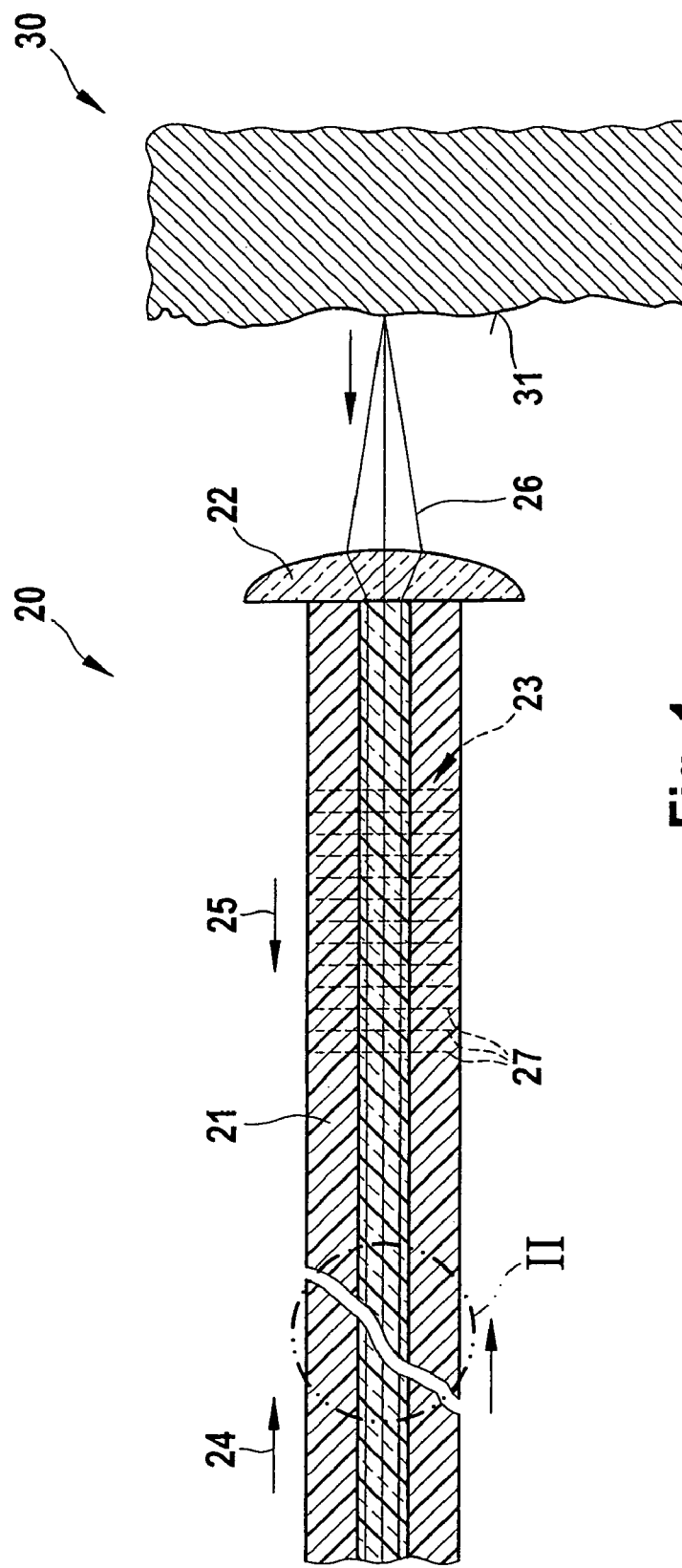
FIG. 1 shows a schematic view of a fiber optic sensor head with respect to a measured object referred to as a test object, according to one example embodiment.

FIG. 1 shows a fiber optic sensor head 20 of the type which is particularly suited for detecting the shape or the distance of a test object 30, in particular a of a rough surface 31 of test object 30 as shown here. Fiber optic sensor head 20 has proven to be particularly suitable for an interferometric measuring system 1, as illustrated in greater detail in FIG. 3.

Fiber optic sensor head 20 has an optical fiber 21, which in the present case is designed as a glass fiber, for conducting and returning two partial beams 24, 25 to and from test object 30, and a lens 22 on the test object side which is used for injecting and extracting a ray beam 26 formed in optical fiber 21 by partial beams 24, 25. Lens 22 is schematically illustrated.

Figure 2:
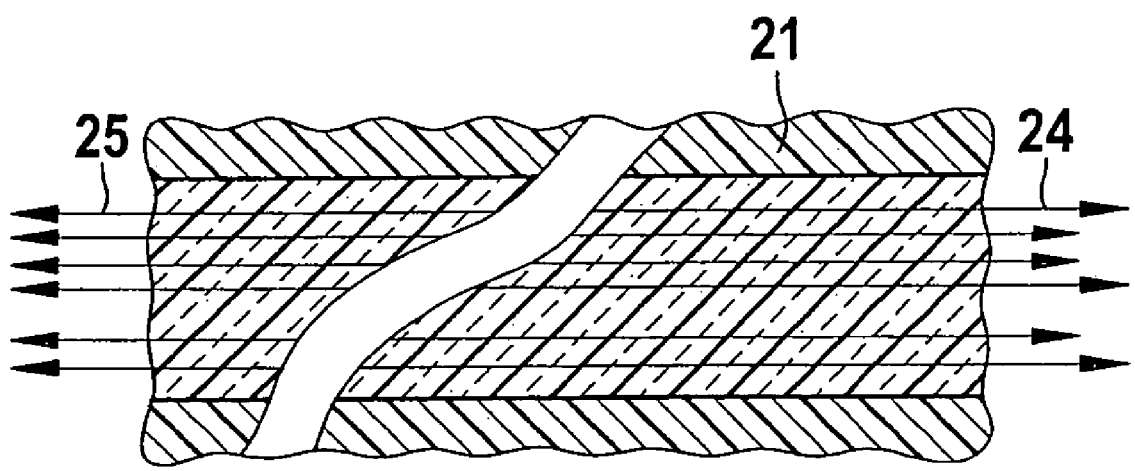
FIG. 2 shows an enlarged detail of the optical fiber of the fiber optic sensor head from FIG. 1.

In the enlarged detail of optical fiber 21 illustrated in FIG. 2, partial beams 24, 25 are symbolically represented by arrows. The length of the arrows indicates the phase position of partial beams 24, 25. It is understood that, even when partial beams are routinely described, these are wave fronts with which a phase angle may be associated.

For conducting, in the present case a partial beam 24 injected on the sensor head side is provided with an optical path length difference, i.e., is formed in the shape of phase-shifted partial waves, to allow heterodyne interferometric detection according to the method described in published German patent documents DE 198 08 273 or DE 198 19 762; at this point it is noted once again that the disclosed contents of published German patent documents DE 198 08 273 and DE 198 19 762 are incorporated by reference into the disclosure of the present specification.

Likewise, partial beam 25, injected on the test object side and without an optical path length difference, is guided within optical fiber 21. In the present case, the optical path length difference is compensated for by a Fizeau interferometer 23 which has a nondiscrete design and is integrated into optical fiber 21, and is designed as a fiber grating which acts as a Bragg reflector, having multiple planes of refractive index modulation 27. As a result of refractive index modulation 27 thus generated in optical fiber 21, in-phase reflection causes an in-phase returning partial beam 25 to be generated from injected, phase-shifted partial beam 24.

Within the scope of one example manufacturing method, refractive index modulation 27 of Fizeau interferometer 23 designed as a fiber grating is introduced into optical fiber 21 using appropriately angled interfering UV radiation. The angle is selected in such a way that, for the working wavelength of optical fiber 21 which in the present case is designed as a single-mode fiber, a Bragg reflector results which is situated perpendicular to partial beams 24, 25, i.e., in such a way that the plane of a refractive index-modulation 27 is situated in a cross-sectional plane of optical fiber 21. In the present case, the energy level of the working wavelength of optical fiber 21 is below the UV wavelength range, i.e., is situated in a longer-wave wavelength range. This may be, for example, a visible wavelength range or an IR wavelength range.

Figure 3:
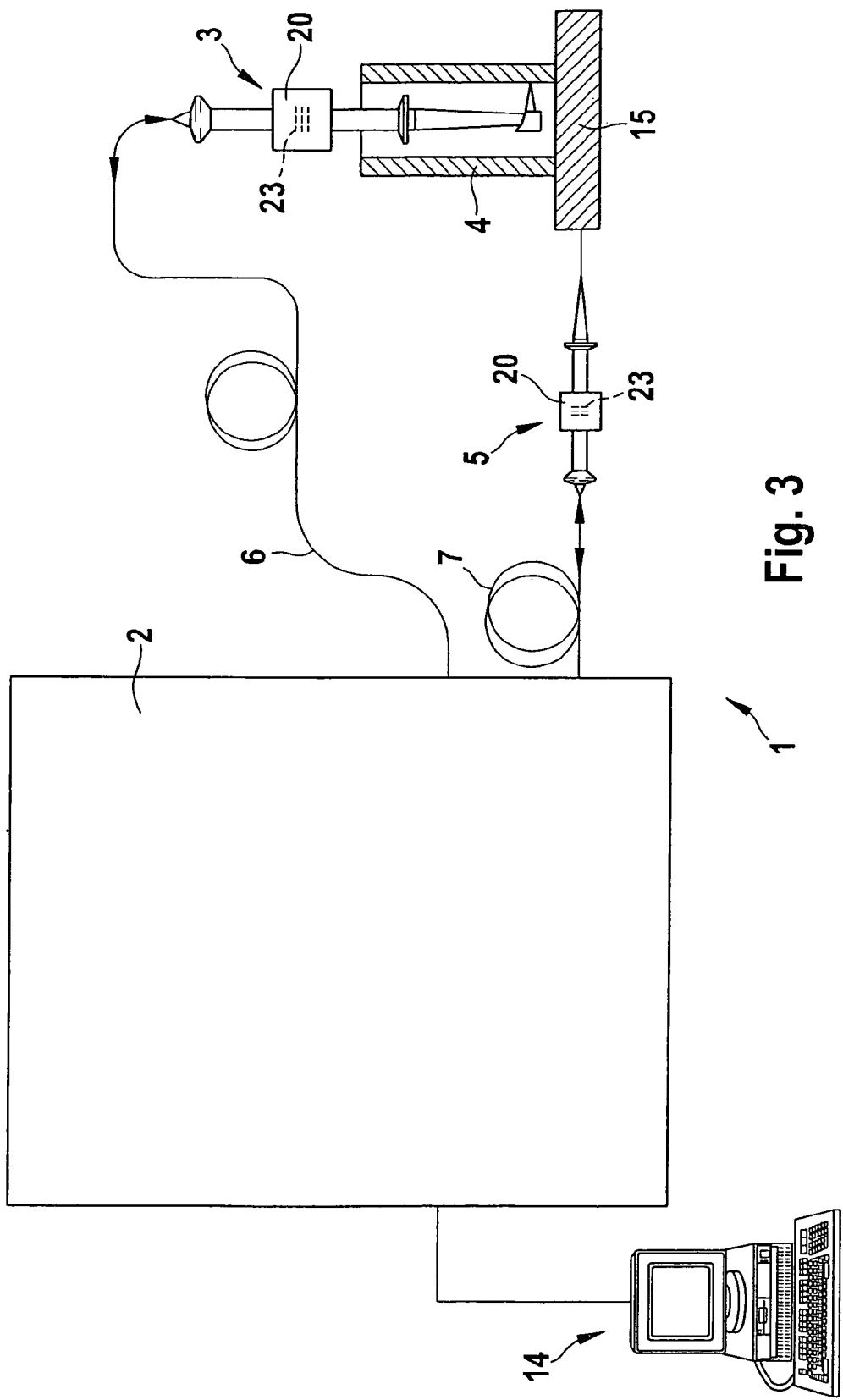
FIG. 3 shows a schematic illustration of an interferometric measuring system of an example embodiment, together with the fiber optic probe of FIG. 1.

FIG. 3 schematically shows an example embodiment of an interferometric measuring system 1, having a unit 2 designed as a modulation interferometer, and a measuring probe 3 having fiber optic sensor head 20 and Fizeau interferometer 23. In the present case, measuring probe 3 is used for scanning a measured object 4, having a rough surface to be measured, situated on a turntable 15. In addition, a reference probe 5 is likewise provided with fiber optic sensor head 20 and fiber-integrated Fizeau interferometer 23 of FIG. 1. In the present case, measuring probe 3 and reference probe 5 are connected via optical fibers 6, 7 to unit 2 designed as a modulation interferometer, the unit in turn being connected to an evaluation unit 14. For details of one particularly preferred design of unit 2, in the present case reference is made once again to the disclosed contents of published German patent documents DE 198 08 273 and DE 198 19 762, which are hereby fully incorporated by reference into the disclosure of the present specification. Unit 2 is provided, among other things, with a beam generator and a superimposition unit for superimposing the reflected measuring reference beam on the reflected measuring beam, and a beam generator and beam receiver for splitting the superimposed radiation into at least two beams having different wavelengths and for converting the radiation into electrical signals which are evaluated by evaluation unit 14. Unit 2 also has a device for modulating the light phase or shifting the light frequency for heterodyne detection of a first partial beam with respect to the light phase or light frequency of a second partial beam.

Furthermore, according to the concept of the present invention the presently described measuring probe 3 and/or reference probe 5 together with fiber optic sensor head 20 and space-saving, fiber-integrated Fizeau interferometer 23 are also suitable for use with units having a design other than as a modulation interferometer.

What is claimed is:

1. A fiber optic sensor head for detecting one of the shape or the distance of a test object, comprising:
    an optical fiber for conducting partial beams to and from the test object;
    a lens positioned on a test object side for injecting and extracting a ray beam; and
    a Fizeau interferometer having a nondiscrete design and associated with the optical fiber, wherein partial beams injected on a sensor head side and having an optical path length difference are conducted to the test object, and wherein returning partial beams injected on the test object side without an optical path length difference are conducted, the Fizeau interferometer compensating for the optical path length difference between the partial beams injected on the sensor head side and the returning partial beams injected on the test object side, wherein the Fizeau interferometer is integrated into the optical fiber and wherein for forming the Fizeau interferometer, the optical fiber includes a fiber grating which acts as a Bragg reflector.

2. The fiber optic sensor head as recited in claim 1, wherein UV radiation is used to introduce the fiber grating into the optical fiber.

3. The fiber optic sensor head as recited in claim 1, wherein the fiber grating is aligned parallel to the cross section of the optical fiber and essentially perpendicularly to the direction of the partial beams.

4. The fiber optic sensor head as recited in claim 1, wherein the optical fiber is configured as a single-mode fiber.

5. The fiber optic sensor head as recited in claim 1, wherein the optical fiber is configured for a wave wavelength longer than a UV-wavelength range.

6. An interferometric measuring system for detecting one of the shape or the distance of a test object, comprising:

a modulation interferometer unit configured for generating two partial beams having an optical path length difference;

a measuring probe; and a reference probe;

wherein the measuring probe and the reference probe are each configured as a probe having a fiber optic sensor head including:

an optical fiber for conducting partial beams to and from the test object;

a lens positioned on a test object side for injecting and extracting a ray beam; and a Fizeau interferometer having a nondiscrete design and associated with the optical fiber, wherein partial beams injected on a sensor head side and having an optical path length difference are conducted to the test object, and wherein returning partial beams injected on the test object side without an optical path length difference are conducted, the Fizeau interferometer compensating for the optical path length difference between the partial beams injected on the sensor head side and the returning partial beams injected on the test object side, wherein the Fizeau interferometer is integrated into the optical fiber and wherein for forming the Fizeau interferometer, the optical fiber includes a fiber grating which acts as a Bragg reflector.

7. The interferometric measuring system as recited in claim 6, wherein a radiation generated by the modulation interferometer is short-coherent over time and is broadband.

8. The interferometric measuring system as recited in claim 7, wherein the modulation interferometer and at least one of the measuring probe and the reference probe are connected in a light-guiding manner via the optical fiber.

9. The interferometric measuring system as recited in claim 7, wherein for heterodyne detection the modulation interferometer is provided with a device configured for one of modulating the light phase of a first partial beam with respect to the light phase of a second partial beam or shifting the light frequency of a first partial beam with respect to the light frequency of a second partial beam.

* * * * *